United States Patent
Yun et al.

(10) Patent No.: US 7,848,513 B2
(45) Date of Patent: Dec. 7, 2010

(54) METHOD FOR TRANSMITTING SECURITY CONTEXT FOR HANDOVER IN PORTABLE INTERNET SYSTEM

(75) Inventors: Mi-Young Yun, Daejeon (KR); Sang-Ho Lee, Daejeon (KR)

(73) Assignees: Samsung Electronics Co., Ltd. (KR); Electronics and Telecommunications Research Institute (KR); Hanaro Telecom, Inc. (KR); SK Telecom Co., Ltd. (KR); KT Corporation (KR)

( * ) Notice: Subject to any disclaimer, the term of this patent is extended or adjusted under 35 U.S.C. 154(b) by 1032 days.

(21) Appl. No.: 11/635,113

(22) Filed: Dec. 7, 2006

(65) Prior Publication Data

US 2007/0154017 A1    Jul. 5, 2007

(30) Foreign Application Priority Data

Dec. 8, 2005    (KR) .................. 10-2005-0119923

(51) Int. Cl.
- *H04L 9/00* (2006.01)
- *H04L 9/32* (2006.01)
- *G06F 7/04* (2006.01)

(52) U.S. Cl. ............... 380/27; 380/28; 380/29; 380/30; 713/168; 713/169; 713/170; 713/171; 726/27; 726/28; 726/29; 726/30

(58) Field of Classification Search .......... 380/27
See application file for complete search history.

(56) References Cited

U.S. PATENT DOCUMENTS 7,236,477 B2 *    6/2007    Emeott et al. .............. 370/331

FOREIGN PATENT DOCUMENTS

| KR | 1020050041392 | 5/2005 |
|----|---------------|--------|
| WO | WO 01/39538   | 5/2001 |

* cited by examiner

*Primary Examiner*—Longbit Chai
(74) *Attorney, Agent, or Firm*—The Farrell Law Firm, LLP

(57) ABSTRACT

A method for transmitting a handover security context of a first access point, when an access terminal from a service cell of a first access point is connected to a packet access router, to a service cell of a second access point connected to the packet access router, is provided. The handover security context transmitting method includes confirming whether a handover confirmation message transmitted from the access terminal has a security context therein; when the handover confirmation message has a security context therein, confirming whether the security context has security-related information therein; when the security context has security-related information therein, confirming whether the security context has a traffic-related key or a pairwise master key; and transmitting an information instruction message including the security related information confirmed in the security context, the security-related information, the traffic-related key, and the pairwise master key through the PAR to the second AP.

15 Claims, 9 Drawing Sheets

METHOD FOR TRANSMITTING SECURITY CONTEXT FOR HANDOVER IN PORTABLE INTERNET SYSTEM

PRIORITY

This application claims priority to and the benefit of Korean Patent Application No. 10-2005-0119923 filed in the Korean Intellectual Property Office on Dec. 8, 2005, the entire contents of which are incorporated herein by reference.

BACKGROUND OF THE INVENTION (a) Field of the Invention

The present invention relates to a method for transmitting security context for handover in a portable Internet system, and more particularly, the present invention relates to a method for transmitting a security-related context so as to provide a security-related reestablishment between a mobile terminal and another base station when the mobile terminal performs a handover with the other base station in a portable Internet network.

(b) Description of the Related Art

An AP (access point) as a base station apparatus of a portable Internet system performs a wireless access function with an AT (access terminal) as a mobile terminal, and the AP performs an IP (Internet protocol)-based wire access function with a PAR (packet access router).

The PAR is connected to the AP and performs as an IP router, and also performs a function for controlling a signal process such as a service access and handover. In addition, the PAR performs a client function such as a user authentication and a mobile IP registration.

The portable Internet system has increasingly required that the AT may continuously use Internet service even after performing a handover. The handover means a function that the AT is automatically synchronized to a new channel and continuously maintains a service state when a service-using AT leaves the present service area and moves to another service area.

Accordingly, a method for transmitting handover-related information is desired such that the AT may continuously use an Internet service after performing a handover.

Meanwhile, the portable Internet network may largely uses two types of keys for security. One key is used for security of a control message, and the other key is used for traffic encryption and traffic decryption.

A key for signal message security is called an AK (authentication key). When the AT is authenticated using EAP (extensible authentication protocol), the AK is generated using a key value allocated by an authentication, authorization, and accounting (AAA) server and the generated AK is used between the corresponding AT and AP.

A system for generating such an AK may be AP or PAR. That is, so as to generate an AK between the AT and the AP, the AAA key is required. At this time, the AT may know an AAA key during a session connection, but a new AP when performing a handover may not know an AAA key, and accordingly, a method for transmitting the same to the new corresponding AP must be defined.

In addition, the traffic security-related keys may include a TEK (traffic encryption key) used for unicast traffic, a GTEK (group TEK) used for multicast traffic, and an MGTEK (MBS group traffic encryption key) used for MBS (multicast and broadcast service) traffic.

All the traffic-related keys may be generated and managed by the AP. The used traffic key of the previous AP may be continuously used between the new AP and the AT, or a new key may be allocated by the new AP. In both cases, the previous AP must transmit traffic-related keys to the new AP.

In addition, security-related (security association) information between the AT and the AP, AT-security capability information, or the like must be transmitted to the new AP.

SUMMARY OF THE INVENTION

The present invention has been made in an effort to provide a method for transmitting security context for handover in a portable Internet system having advantages of guaranteeing safe communication between an AT and a new AP by security-related reestablishment after performing a handover.

The present invention has been made in an effort to provide a method for transmitting security context for handover in a portable Internet system having advantages of performing a fast handover by decreasing a delay of a desired information transmission of the security-related reestablishment. According to an aspect of the present invention, a method for transmitting a handover security context when an AT from a service cell of a first AP connected to a PAR (packet access router) to a service cell of a second AP connected to the PAR is provided. An exemplary embodiment of the present invention provides a handover security context transmitting method of the first AP. The handover security context transmitting method includes confirming whether a handover confirmation message transmitted from the AT has a security context therein. When the handover confirmation message has a security context therein, it is confirmed whether the security context has security-related information therein, and when the security context has security-related information therein, it is confirmed whether the security context has a traffic-related key or a pairwise master key (PMK). The method further includes transmitting an information instruction message including the security-related information confirmed in the security context, the security-related information, the traffic-related key, and the pairwise master key through the PAR to the second AP.

Another embodiment of the present invention provides a handover security context transmitting method of the second AP. The handover security context transmitting method of the second AP includes receiving an information instruction message including security context from the PAR; confirming whether the information instruction message has pairwise master key information of the AT therein; when the information instruction message has pairwise master key information of the AT therein, generating a first authentication key using the information instruction message; and, when the information instruction message has pairwise master key information of the AT therein, generating a message authentication code (MAC) using the first authentication key and transmitting a ranging response message to the AT. The method may include confirming whether the information instruction message has a second authentication key therein when the information instruction message has no pairwise master key information of the AT therein, and generating a message authentication code using the second authentication key and transmitting a ranging response message when the information instruction message has the second authentication key therein.

Yet another embodiment of the present invention provides a handover security context transmitting method of the PAR. The handover security context transmitting method of the PAR includes receiving an information instruction message from the first AP; confirming whether the information instruction message has first pairwise master key information of the AT therein; and when the information instruction message has the first pairwise master key information of the AT therein, transmitting the information instruction message including the first pairwise master key information to the second AP. The method may further include confirming whether the PAR-managed information has the second pairwise master key information of the AT when the information instruction message has no first pairwise master key information of the AT therein, generating authentication keys to be used at the second AP when the PAR-managed information has the second pairwise master key information of the AT, and transmitting the information instruction message including the authentication key information to the second AP when the PAR-managed information has the second pairwise master key information of the AT. Another aspect of the present invention provides a method for a second AP to transmit a drop-handover security context, after an AT service is stopped, from a service cell of a first AP connected to a PAR to a service cell of a second AP connected to the PAR.

An exemplary embodiment of the present invention provides a drop-handover security context transmitting method of the second AP. The method includes receiving a ranging request message from the AT; transmitting the ranging request message including a subsidiary handover request message through the PAR to the first AP; receiving a subsidiary handover response message from the first AP through the PAR; confirming whether the subsidiary handover response message has a pairwise master key therein; when the subsidiary handover response message has the pairwise master key therein, generating an authentication key; and generating a KEK (key encryption key) using the authentication key.

Another embodiment of the present invention provides a handover security context transmitting method of the PAR. The method includes receiving a subsidiary handover request message from the second AP and transmitting the same to the first AP; receiving a subsidiary handover response message from the first AP; confirming whether the subsidiary handover response message has first pairwise master key information therein; when the subsidiary handover response message has first pairwise master key information therein, transmitting a subsidiary handover response message including the first pairwise master key information; and receiving a subsidiary handover arrive message in response to the subsidiary handover response message to the second AP and transmitting the same to the first AP. The method may include, when the subsidiary handover response message has no first pairwise master key information therein, confirming whether the PAR-managed information has second pairwise master key information of the AT; when the PAR-managed information has the second pairwise master key information of the AT therein, generating an authentication key; and when the PAR-managed information has the second pairwise master key information of the AT therein, transmitting the subsidiary handover response message including the authentication key information to the second AP.

Yet another embodiment of the present invention provides a handover security context transmitting method of the first AP. The method includes receiving a subsidiary handover request message from the second AP through the PAR; confirming whether the subsidiary handover request message has a security context of the AT therein; when the subsidiary handover request message has a security context of the AT therein, confirming authentication of a ranging request message using an authentication key of the AT; when the authentication result of the ranging request message is given as a success, confirming whether the subsidiary handover request message has a traffic-related key or a pairwise master key of the AT; and transmitting a subsidiary handover response message including the security-related information confirmed among the security context, the traffic-related key, and the pairwise master key to the second AP.

DETAILED DESCRIPTION OF THE EMBODIMENTS

As those skilled in the art would realize, the described embodiments may be modified in various different ways, all without departing from the spirit or scope of the present invention.

Hereinafter, a handover security context transmitting method of a portable Internet system according to an exemplary embodiment of the present invention is described in detail with reference to drawings.

According to an exemplary embodiment of the present invention, a method for a base station transmitting a security-related context for a security-related reestablishment is provided when a mobile terminal is handed over to another base station in a portable Internet network.

In the portable Internet network, the handover may be divided into a general handover and a drop-handover. According to an exemplary embodiment of the present invention, the method for the base station transmitting a security-related context for a security-related reestablishment may guarantee safe communication between an access terminal and a new access point by a security-related reestablishment after performing a handover and support a fast handover. The drop-handover means a handover when the mobile terminal is disposed not in the previous cell but in a new cell after a communication disconnection or pause mode occurs.

Figure 1:
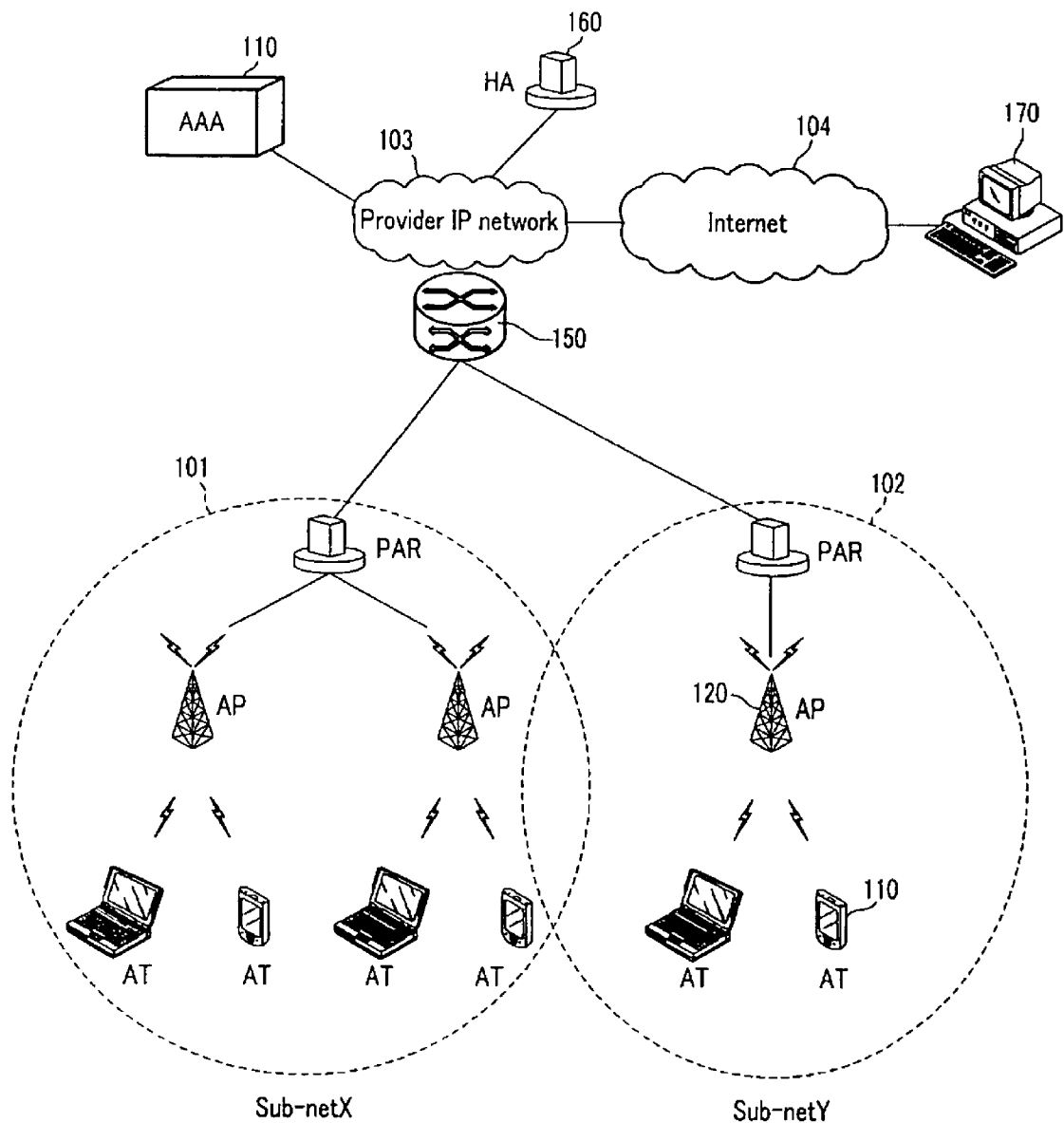
FIG. 1 is a schematic diagram of a portable Internet network according to an exemplary embodiment of the present invention.

FIG. 1 is a schematic diagram of a portable Internet network according to an exemplary embodiment of the present invention.

Referring to FIG. 1, a mobile terminal (AT, access terminal) 110 performs wireless access with a base station (AP, access point) 120 and has mobility.

The AP 120 performs a wireless access function with the mobile terminal 110, and performs an IP-based wire access function with a PAR (packet access router, 130).

The PAR 130 is connected to the AP 120, functions as an IP router, and performs a function for controlling a signal process such as a service access and a handover. As shown in FIG. 1, the PAR 130 has an area of a single IP subnet 101 and 102, and such PARs 130 are connected to a provider IP network 103 through a router 150 and accessed to a common Internet 104. The common Internet 104 may be connected to a client terminal 170.

In addition, the provider IP network 103 is connected by an AAA (authentication, authorization, and accounting) server 140 and an HA (home agent) 160 as a home server of a mobile IP.

As shown in FIG. 1, the HA 160 processes a basic call of the mobile IP, and the PAR 130 performs a foreign agent function.

In the portable Internet system, a stack of transmitting/receiving control protocols between the AP 120 and the PAR 130 includes a PHY (physical layer), a MAC (medium access control), an IP (Internet protocol), an SCTP (stream control transmission protocol), and an ANAP (access network application part).

The ANAP is a protocol for defining control messages for smooth communication between the AP 120 and the PAR 130, and the SCTP is a protocol used for transmission reliability.

Specifically, a header of the ANAP includes a message type field, a length field, and a transaction ID field. The message type field classifies types of the transmitting/receiving control messages between the AP 120 and the PAR 130.

Such a message type field expresses a type-related message, a handover request message (HOreq), a handover response message (HOrsp), a handover instruction message (HOind), a handover conformation message (HOcnf), an AP context information instruction message (ACIind), and an AP context information conformation message (ACIcnf) among the message types that are handover messages transmitted between a new AP and the PAR 130 so as to continuously receive a service in a new cell when the AT 110 using a portable Internet service in a previous cell moves to the new cell.

In addition, among the message types, a subsidiary handover request message (XHOreq), a subsidiary handover response message (XHOrsp), a subsidiary handover instruction message (XHOind), a subsidiary handover conformation message (XHOcnf), a subsidiary handover arrive message (XHOack), an AP context information instruction message (ACIind), and an AP context information confirmation message (ACIcnf) are used to perform a subsidiary handover so as to again receive a service in the new cell when the AP is located in the new cell by the AT 110 using a portable Internet service in the previous cell restarting a disconnected communication, or returning from a pause mode block to an active mode block.

Figure 2:
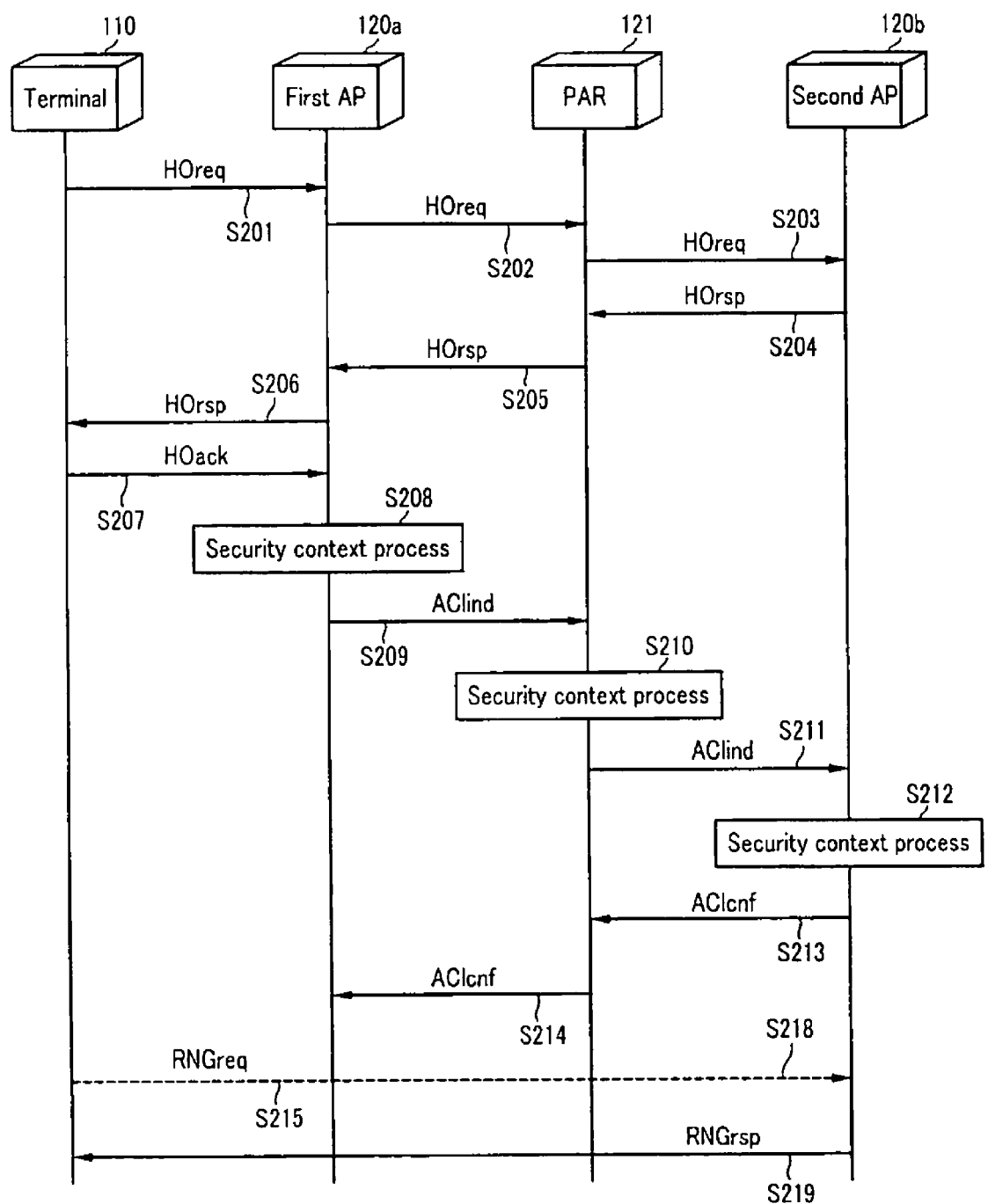
FIG. 2 illustrates a handover according to a first exemplary embodiment of the present invention.

FIG. 2 illustrates a handover according to a first exemplary embodiment of the present invention.

Generally, in the portable Internet network, types of handovers include an inter-sector handover, an inter-AP handover, and an inter-PAR handover. An exemplary embodiment of the present invention may be used for the inter-AP handover and the inter-PAR handover.

Referring to FIG. 2, the candicate AP can be at least one AP, but on performing a handover, only one AP, a second AP 120b, is selected. The previous AP, that is, a first AP 120a transmits security-related information to the new AP, that is, a second AP 120b, according to the same process.

First, when the AT 110 searches peripheral APs and determines to perform a handover, it transmits a handover request message (HOreq) including the searched APs to the first AP 120a (S201).

The first AP 120a receives the handover request message (HOreq) and transmits a handover request message (HOreq) (S202, S203). At this time, the PAR 130 receives the handover request message (HOreq) (S202), and transmits the same to all the included second APs 120b (S203).

The new APs 120b receive the handover request message (HOreq) and responds with a handover response message (HOrsp) to the previous AP 120a (S204, S205). The PAR 130 receives the handover response message (HOrsp) (S204) and transmits it to the previous AP 120a (S205).

The previous AP 120a transmits a handover response message (HOrsp) to the AT 110 in response to the handover response message (HOrsp) (S206). The AT 110 selects one AP 120b from among the new APs and transmits a handover confirmation message (HOack) to the first AP 120a (S207).

The first AP 120a processes a security-related context with the AT 110 (S208) and transmits an information instruction message (AcIind) including the security-related context and session extension information (S209).

In addition, the PAR 130 processes the security context according to the information instruction message (ACIind) (S210), and transmits the information instruction message (ACIind) to the second AP 120b (S211).

The second AP 120b receives the information instruction message (ACIind) and processes the security context, and sends a confirmation message (ACIcnf) to the first AP 120a in response to the received information instruction message (ACIind) (S213, S214). At this time, the information confirmation message (ACIcnf) is transmitted through the PAR 130 (S213) to the first AP 120a (S214).

Thereafter, the AT 110 transmits a ranging request message (RNGreq) to the second AP 120b (S215), and the second AP 120b transmits a ranging response message (RNGrsp) to the AP 110 in response to the ranging request message (RNGreq) (S216).

That is, when the AT 110 and the second new AP 120b exchange new security-related capability and new keys though ranging messages and security-related messages according to a handover optimization policy, the new security-related information may be reestablished between the AT 110 and the new AP 120b.

The security context processing of the first AP 120a (S208), the security context processing of the PAR 130 (S210), and the security context processing of the second AP 120b (S212) will be respectively described with reference to FIG. 4 to FIG. 6.

Figure 3:
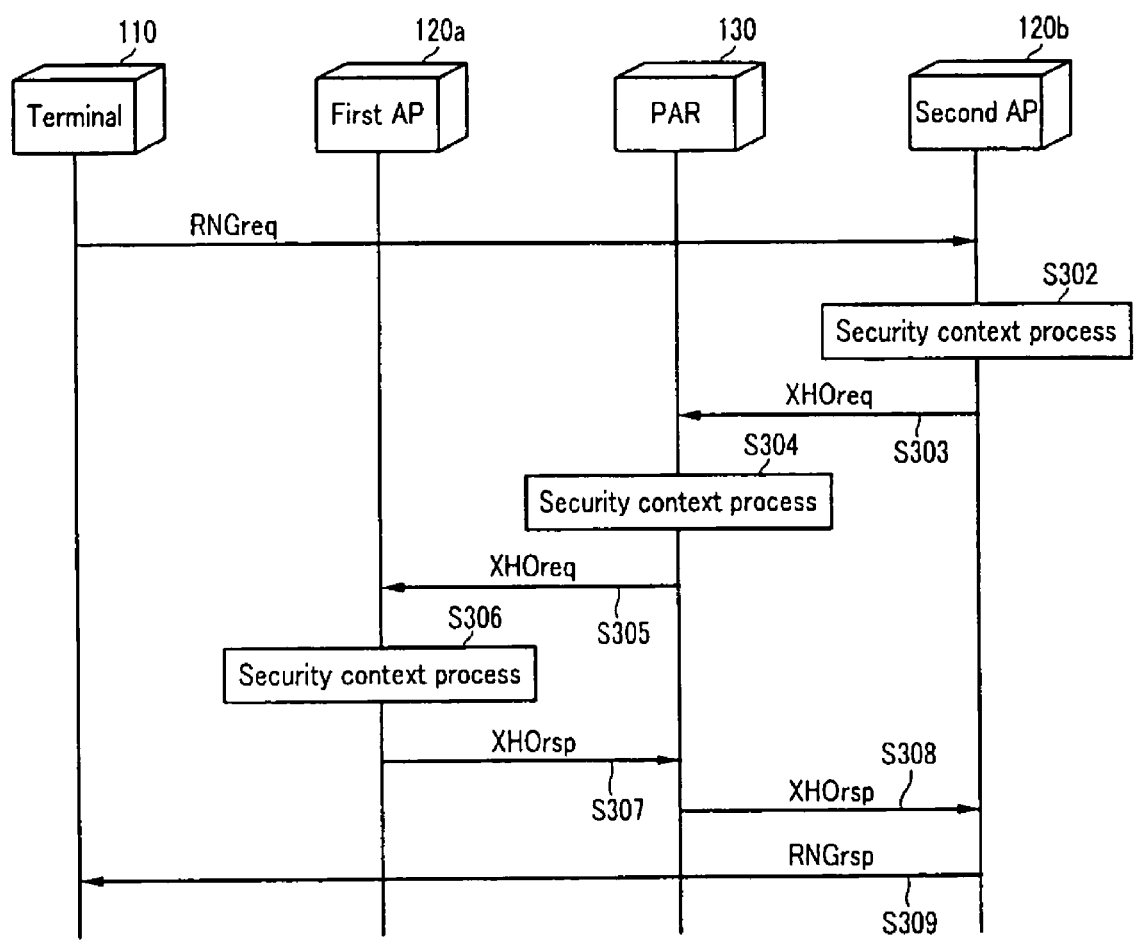
FIG. 3 illustrates a drop-handover according to a second exemplary embodiment of the present invention.

Meanwhile, FIG. 3 illustrates a drop-handover according to a second exemplary embodiment of the present invention. According to a drop-handover process of FIG. 3, unlike the handover process of FIG. 2 in which the AT establishes a connection to the new AP before the AT moves, the AT accessing a service selects the new AP and accesses the new AP when it is disconnected from the previous AP.

Referring to FIG. 3, when the AT 110 is disconnected from the service-using AP 120a, it transmits a ranging request message (RNGreq) for controlling synchronization and a wireless parameter to the connectable second AP 120b (S301).

The ranging request message (RNGreq) includes a message authentication code (MAC) generated according to the security-related information of the previous AP 120a. The MAC is uses to transmit specific information of the corresponding message and may include a type field, a length field, and a value field.

The new AP 120b then performs security context processing (S302).

Since the new AP 120b having received the ranging request message (RNGreq) may not confirm the MAC, it transmits a subsidiary handover request message (XHOreq) including the ranging request message (RNGreq) to the PAR 130 (S303).

The PAR 130 performs a security context process (S304) and transmits the subsidiary handover request message (XHOreq) to the previous AP 120a (S305).

The previous AP 120a performs a security context process (S306). That is, the previous AP 120a having received the handover request message (XHOreq) authenticates the subsidiary handover request message (XHOreq) through the MAC.

Thereafter, the previous AP 120a includes the security-related information of the corresponding AT 110 in the subsidiary handover response message (XHOrsp) and transmits the same though the PAR 130 (S307) to the second new AP 120b (S308).

Accordingly, the second AP 120b having received the AT 110-related security information generates a ranging response message (RNGrsp) using the new authentication key (AK) and transmits the generated ranging response message (RNGrsp) to the AT 110 (S309).

When the AT 110 and the second new AP 120b exchange new security-related capability and new keys though ranging messages and security-related messages according to a handover optimization policy, the new security-related information may be reestablished between the AT 110 and the new AP 120b.

The security context process of the new AP 120b (S302), the security context process of the PAR 130 (S304), and the security context process of the previous AP 120a (S306) will be respectively described with reference to FIG. 7 to FIG. 9.

Figure 4:
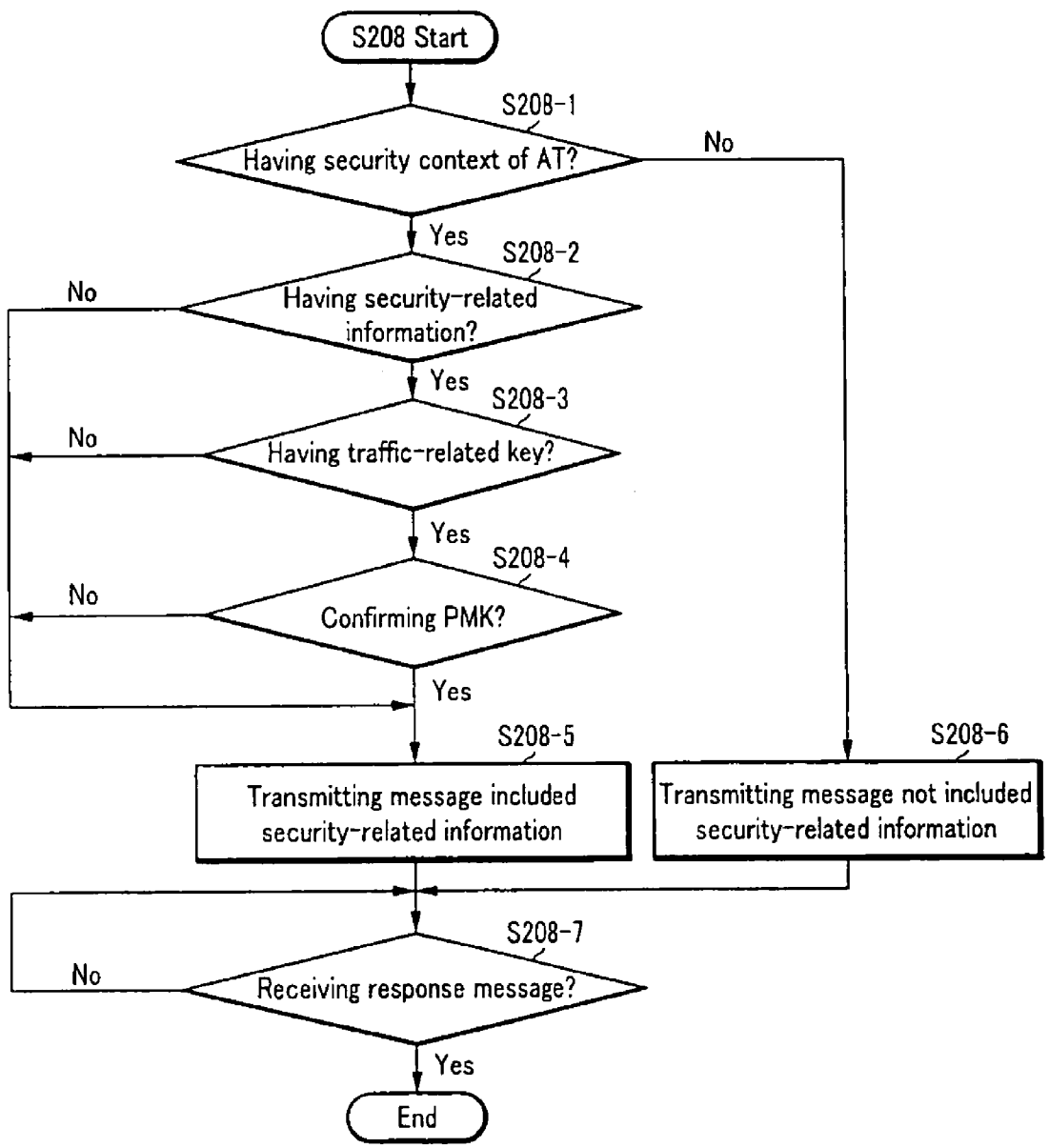
FIG. 4 to FIG. 6 respectively illustrates a flowchart of a method for processing a security context on the handover according to the first exemplary embodiment of the present invention.
Figure 5:
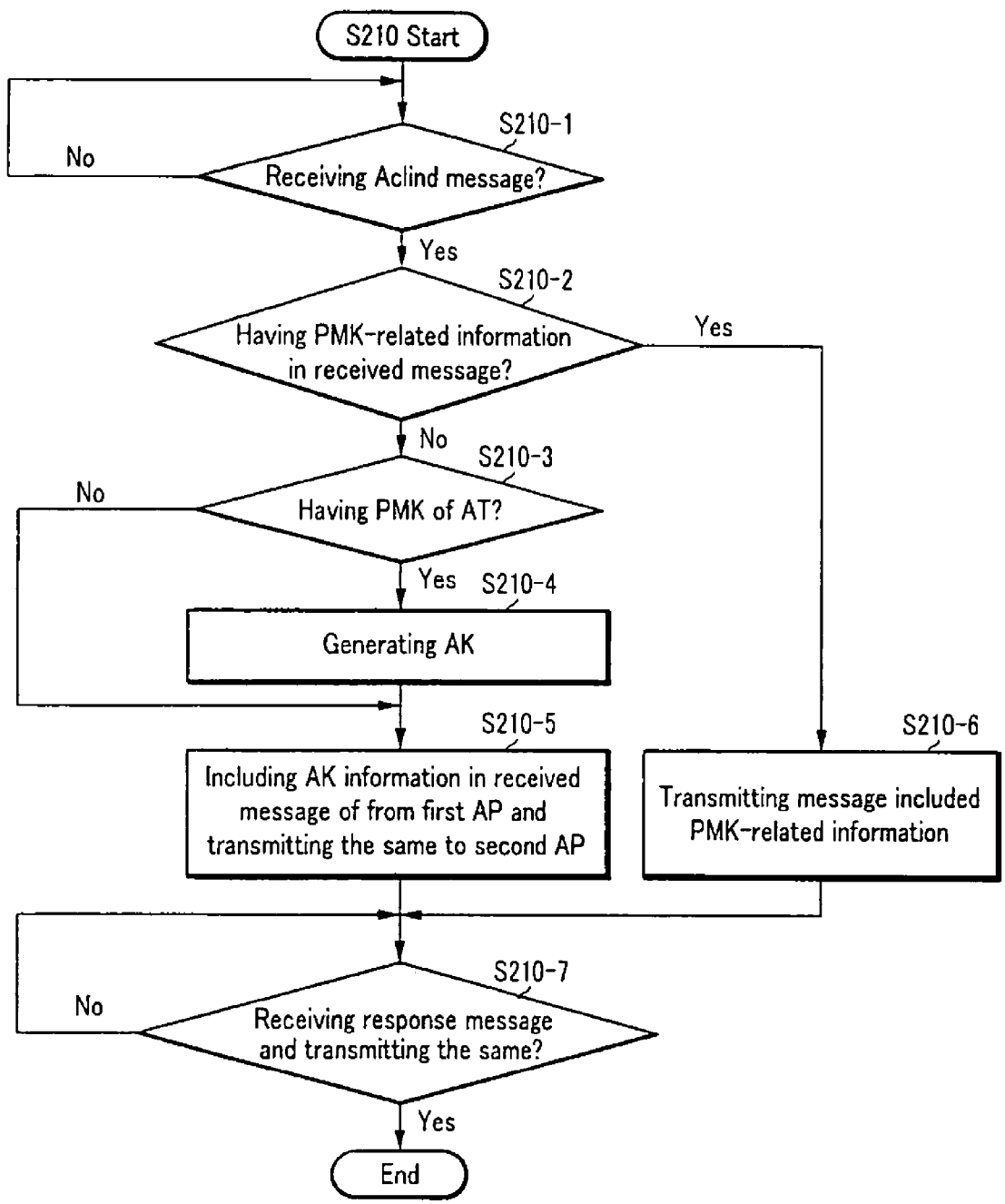
Figure 6:
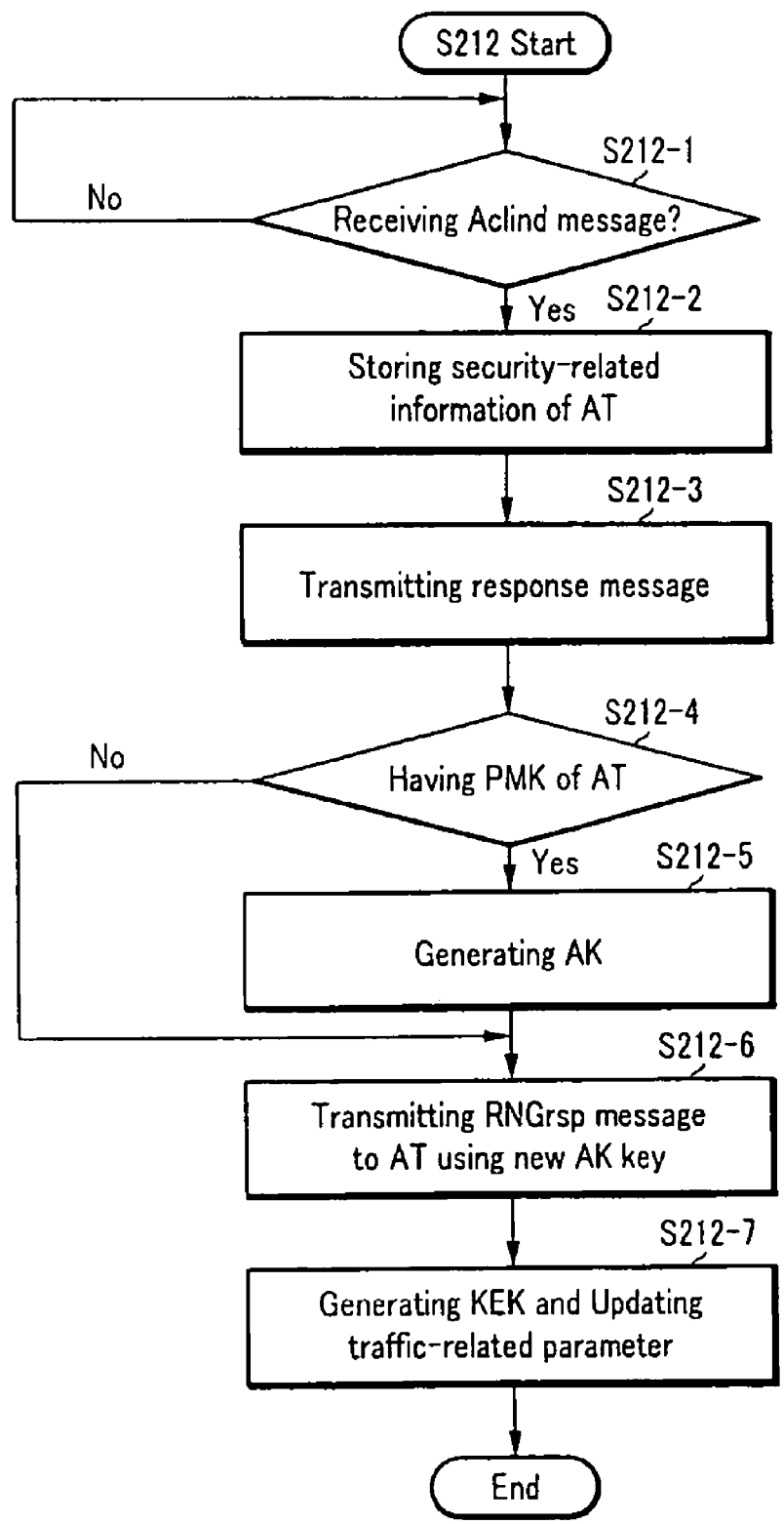

FIG. 4 to FIG. 6 respectively illustrate flowcharts of a method for processing a security context on the handover according to the first exemplary embodiment of the present invention.

Referring to FIG. 4, the security context process of the previous AP 120a (S208 of FIG. 2) is as follows.

First, the previous AP 120a that confirms the AP to perform a handover has a security context of the corresponding AT 110, when the target AP is the AT 110, performs a handover (S208-1).

When it has a security context of the corresponding AT 110, the previous AP 120a confirms the security context to have security connection information (S208-2) therein.

Next, when the security context has security connection information, the previous AP 120a confirms the security context to have traffic-related keys therein (S208-3).

Next, the previous AP 120a confirms the security context to have a pairwise master key (PMK) (S208-4).

Thereafter, the previous AP 120a transmits an information instruction message (AcIind) including all the security-related information confirmed at the steps S208-2 to S208-4 to the PAR 130 and the new AP 120b (S208-5).

When there is no security context at the step S208-1, the previous AP 120a transmits the instruction message (AcIind) not including all the security-related information to the PAR 130 and the new AP 120b (S208-6).

Lastly, the previous AP 120a waits for reception of a response message (S208-7) and then finishes the security context process.

Referring to FIG. 5, the security context process of the PAR 130 (210 of FIG. 2) is as follows.

The PAR 130 receives an information instruction message (ACIind) from the previous AP 120a (S210-1) and confirms the received information instruction message (ACIind) to have pairwise master key (PMK) information (S210-2).

When there is no PMK information therein, the PAR 130 confirms self-managed information to have the PMK of the AT 110 (S210-3). At this time, when there is no PMK of the AT 110, the PAR 130 generates an authentication key (AK) to be used by the new AP 120b (S210-4) and transmits an information instruction message (AcIind) including the AK information to the new AP 120b (S210-5). In addition, when there is no PMK of the AT 110, the PAR 130 transmits the information instruction message (AcIind) to the new AP 120b.

At the step S210-2, when the received information instruction message (ACIind) from the previous AP 120a has PMK information, the PAR 130 transmits the information instruction message (ACIind) including the PMK information to the new AP 120b (S210-6).

The PAR 130 receives a response message from the new AP 120b, confirms the information instruction message (ACIind) including the AK information or PMK information to be transmitted (S210-7), and then finishes the security context process.

Referring to FIG. 6, the security context process (S212 of FIG. 2) and the ranging response message (RNGrsp) process (S216 of FIG. 2) of the new AP 120b are as follows.

When the new AP 120b receives the information instruction message (ACIind) including the security context (S212-1), it stores security information of the AT 110 (S212-2), and transmits the response message for informing the information instruction message (ACIind) to be received (S212-3).

When the received information instruction message (ACIind) has the PMK of the AT therein (S212-4), the new AP 120b generates an authentication key (AK) using the information instruction message (ACIind) (S212-5).

When the received information instruction message (ACIind) has the authentication key (AK) of the AT in place of the PMK, the AP 120b uses the AK included in the information instruction message (ACIind). The new AP 120b generates a MAC using the AK and transmits a ranging response message (RNGrsp) to the AT 110 (S212-6).

Thereafter, the new AP 120b generates a new KEK (key encryption key) using the AK, and updates a traffic key-related parameter according to a policy (S212-7).

Figure 7:
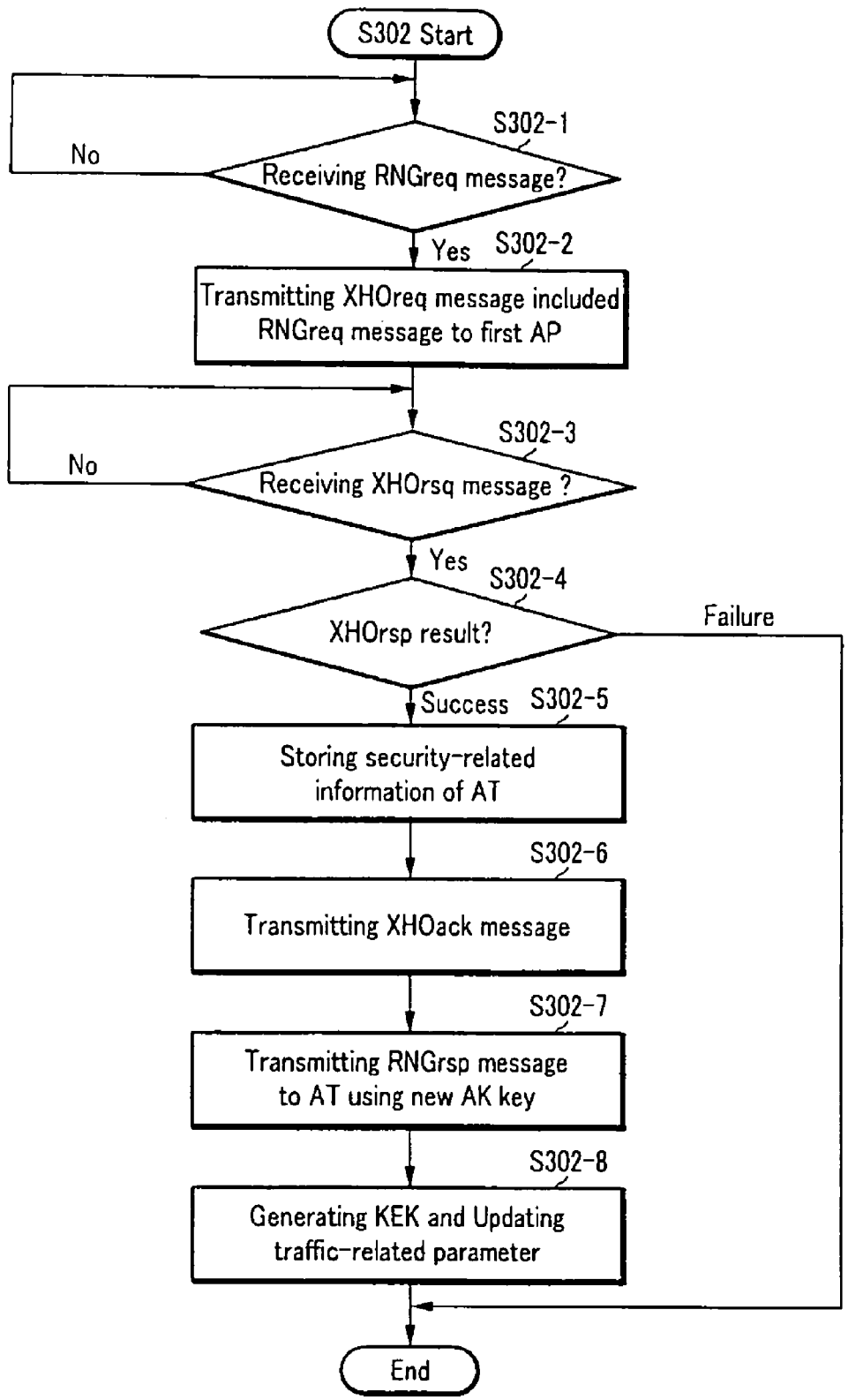
FIG. 7 to FIG. 9 respectively illustrates a flowchart of a method for processing a security context on the drop-handover according to the second exemplary embodiment of the present invention.
Figure 8:
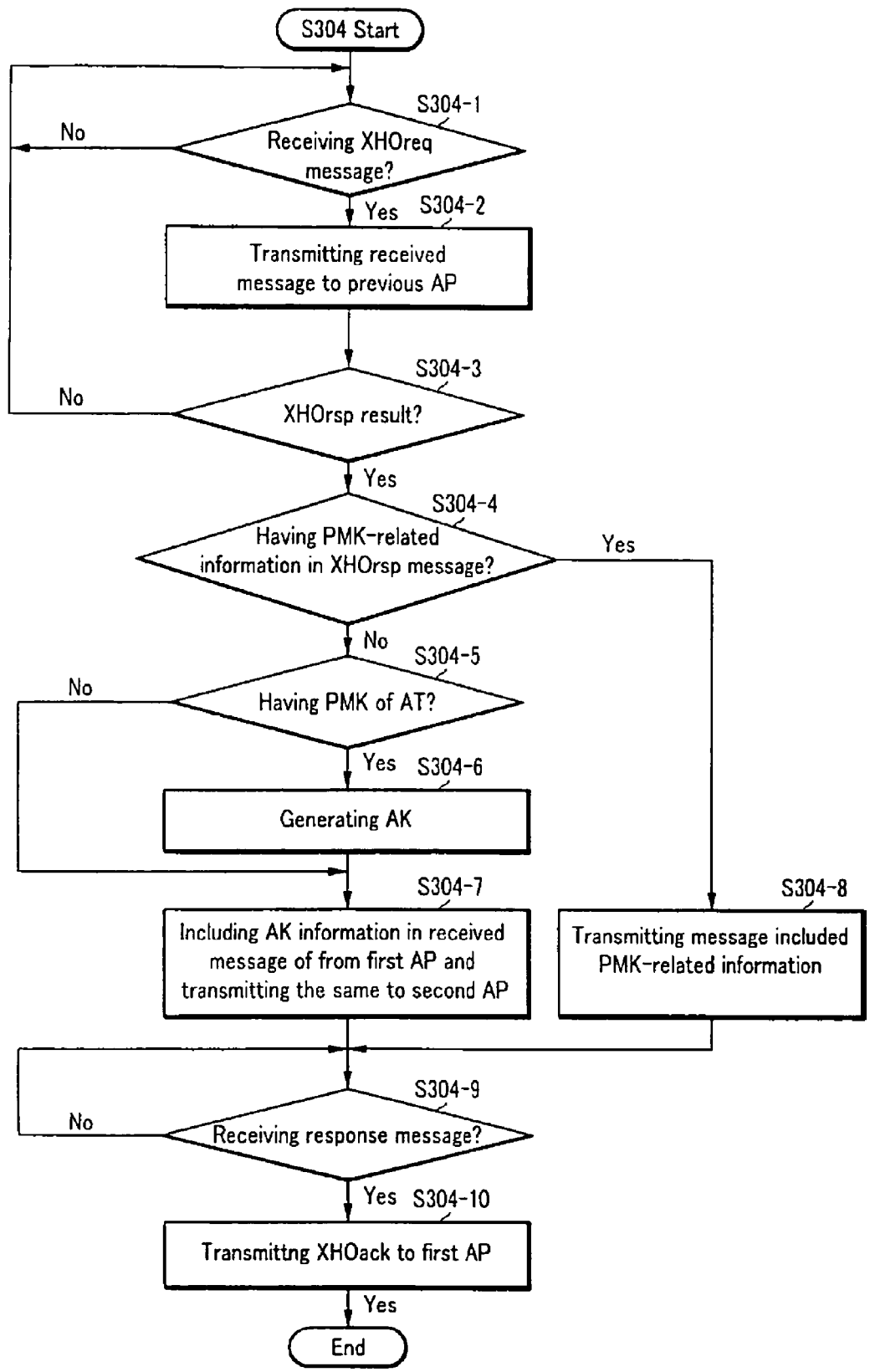
Figure 9:
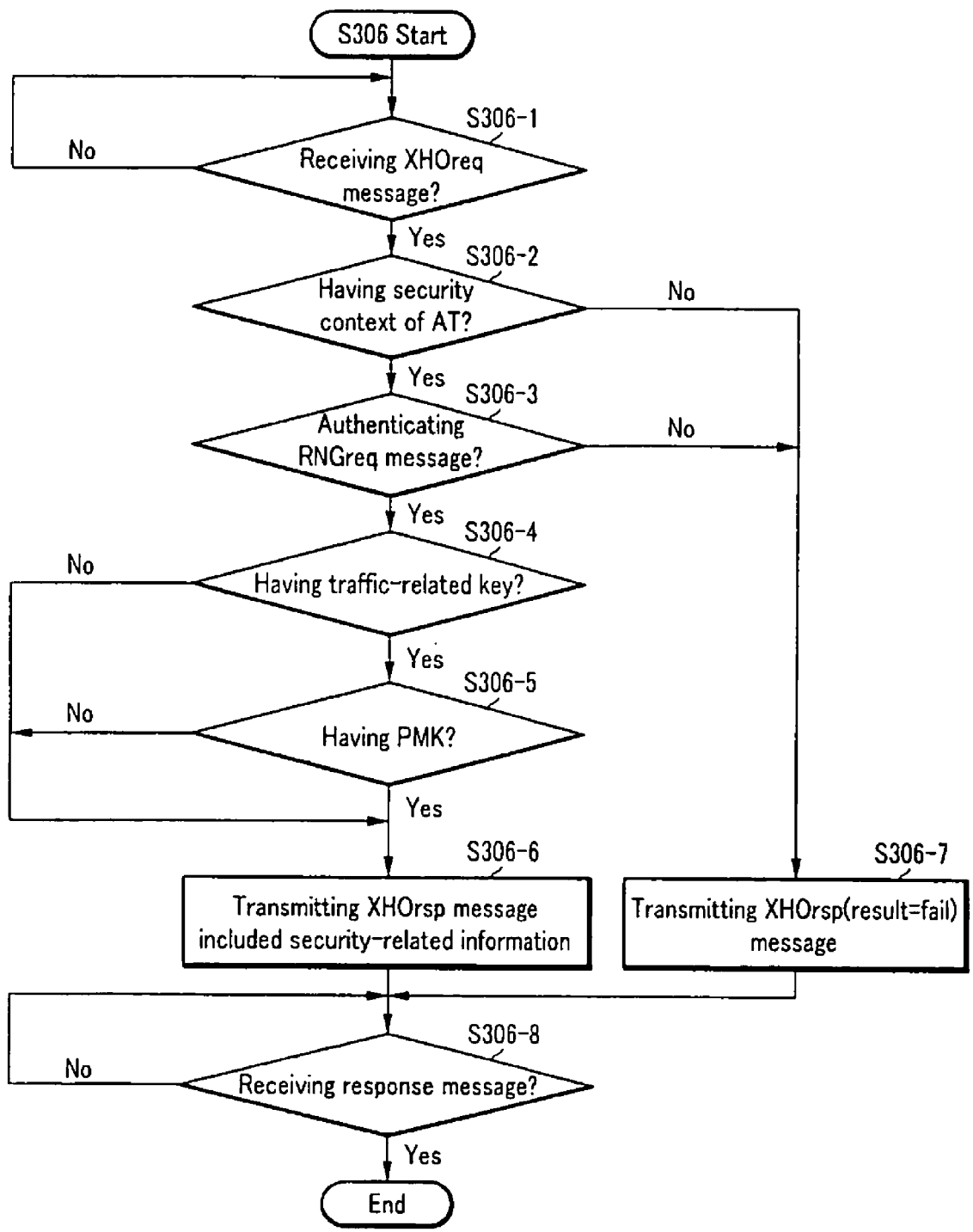

From FIG. 7 to FIG. 9 respectively illustrate flowcharts of a method for processing a security context on the drop-handover according to the second exemplary embodiment of the present invention.

Referring to FIG. 7, the security context process (S302 of FIG. 3) and the ranging response message (RNGrsp) process (S309 of FIG. 3) of the drop-handover of the new AP 120b are as follows.

The new AP 120b receives ranging request message (RNGreq) from the AT 110 (S302-1), and it transmits a subsidiary handover request message (XHOreq) including the received ranging request message (RNGreq) to the corresponding previous AP 120a such that the received ranging request message (RNGreq) is authenticated (S302-2).

The new AP 120b receives the subsidiary handover response message (XHOrsp) (S302-3), and when a result value of the received subsidiary handover response message (XHOrsp) is given as a success (S302-4), it stores the security-related information of the AT 110 included in the received message (S302-5) and it transmits a process result through a subsidiary handover arrival message (XHOack) to the PAR 130 (S302-6).

When the result of the subsidiary handover response message (XHOrsp) includes a pairwise master key (PMK), the new base station 120b directly generates a new authentication key (AK). In addition, when the result of the subsidiary handover response message (XHOrsp) includes the AK, the new base station 120b uses the received AK. That is, the new base station 120b transmits the ranging response message (RNGrsp) to the AT 110 using the AK (S302-7).

Hereinafter, the new AP 120b generates a new KEK (Key Encryption Key) using the AK, and updates the traffic parameter, etc., according to a policy (S302-8).

Referring to FIG. 8, the security context process of the PAR 130 on the drop-handover (S304 of FIG. 3) is as follows.

The PAR 130 receives a subsidiary handover request message (XHOreq) from the new AP 120b (S304-1), and transmits the same to the previous AP 120a (S304-2).

The PAR 130 confirms the received subsidiary handover request message (XHOreq) to have a result value (S304-3), and then confirms the same to have PMK information (S304-4).

At this time, when the received subsidiary handover response message (XHOrsp) has no PMK information, the PAR 130 confirms self-managed information to have a PMK of the AT 110 (S304-5).

When the received subsidiary handover response message (XHOrsp) has no PMK information, the PAR 130 generates an authentication key (AK) to be used by the new AP 120b (S304-6), and it transmits a subsidiary handover response message (XHOrsp) including the AK information to the new AP 120b (S304-7).

When the received subsidiary handover response message (XHOrsp) has PMK information, it transmits a message including the PMK information to the new AP 120b (S304-8).

The PAR 130 receives a subsidiary handover arrival message (XHOack) from the new AP 120b in response to the transmitted message (S304-9), and it transmits the same to the previous AP 120a and finishes the security context process (S304-10).

Referring to FIG. 9, the security context process (S306 of FIG. 3) of the previous AP 120a on the drop-handover is as follows.

The previous AP 120a receives a subsidiary handover request message (XHOreq) (S306-1), and confirms whether it has a security context of the corresponding AT 110 (S306-2).

When there is a security context of the corresponding AT 110, the previous AP 120a authenticates a ranging request message (RNGreq) using an authentication key (AK) of the corresponding AT 110 (S306-3).

When the authentication result of the ranging request message (RNGreq) is positive, the previous AP 120a confirms whether there are traffic keys of the corresponding AT 110 (S306-4), and also whether there are pairwise master keys PMK (S306-5).

The previous AP 120a then generates a subsidiary handover response message (XHOrsp) including all security-related information confirmed through the steps S306-2 to S306-5 and transmits the same (S306-6).

When the authentication of the ranging request message (RNGreq) fails at the step S306-3, the previous AP 120a transmits the subsidiary handover response message (XHOrsp) having a result value of failure to the PAR 130 and the new AP 120b (S306-7).

The previous AP 120a receives a subsidiary handover arrival message (XHOack) from the new AP 120b in response to the transmitted subsidiary handover response message (XHOrsp), and then ends the process (S306-8).

According to an exemplary embodiment of the present invention, the present invention ensures safe communication between an AP and a new AP after handover, and reduces a delay of information transmitting for reset related to the security.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The above-described methods and apparatuses are not only realized by the exemplary embodiment of the present invention, but, in addition, are intended to be realized by a program for realizing functions corresponding to the configuration of the exemplary embodiment of the present invention or a recording medium for recording the program.

What is claimed is:

1. A method for a second Access Point (AP) to transmit a handover security context when an Access Terminal (AT) is moved from a service cell of a first AP connected to a Packet Access Router (PAR) to a service cell of the second AP connected to the PAR, the handover security context transmitting method of the second AP comprising:

receiving an information instruction message including security context at the second AP from the PAR;

confirming, at the second AP, whether the information instruction message has Pairwise Master Key (PMK) information of the AT therein;

generating a first authentication key from the PMK information of the information instruction message at the second AP, when the information instruction message has the PMK information of the AT therein;

generating, at the second AP, a Key Encryption Key (KEK) using the first authentication key; and generating a Message Authentication Code (MAC) using the first authentication key and transmitting a ranging response message from the second AP to the AT when the information instruction message has the PMK information of the AT therein.

2. The handover security context transmitting method of claim 1, further comprising:

confirming, at the second AP, whether the information instruction message has a second authentication key therein when the information instruction message has no PMK information of the AT therein; and generating MAC using the second authentication key at the second AP and transmitting the ranging response message from the second AP to the AT when the information instruction message has the second authentication key therein.

3. The handover security context transmitting method of claim 1, wherein receiving the information instruction message comprises transmitting a response message for informing of reception of the information instruction message from the second AP to the PAR.

4. The handover security context transmitting method of claim 1, wherein the MAC includes a type field, a length field, and a value field, and is used to transmit ranging response message information.

5. A method for transmitting a handover security context of a Packet Access Router (PAR), when an Access Terminal (AT) is moved from a service cell of a first Access Point (AP) connected to the PAR to a service cell of a second AP connected to the PAR, the handover security context transmitting method of the PAR comprising:

receiving an information instruction message at the PAR from the first AP;

confirming, at the PAR, whether the information instruction message has first Pairwise Master Key (PMK) information of the AT therein;

transmitting the information instruction message including the first PMK information from the PAR to the second AP when the information instruction message has the first PMK information of the AT therein;

confirming, at the PAR, whether PAR-managed information includes second PMK information of the AT, when the information instruction message has no first PMK information of the AT therein;

generating, by the PAR, one or more authentication keys to be used at the second AP, when the PAR-managed information includes the second PMK information of the AT; and transmitting the information instruction message including information of the one or more authentication keys to the second AP, when the PAR-managed information includes the second PMK information of the AT.

6. The handover security context transmitting method of claim 5, further comprising receiving a response message to the information instruction message at the PAR from the second AP, and confirming whether the information instruction message is transmitted.

7. A method for transmitting a drop-handover security context of a second Access Point (AP), when an Access Terminal (AT) is serviced no longer serviced by a service cell of a first AP connected to a Packet Access Router (PAR) and is moved to a service cell of the second AP connected to the PAR, the drop-handover security context transmitting method of the second AP comprising:

receiving a ranging request message at the second AP from the AT;

including the ranging request message in a handover request message and transmitting the handover request message from the second AP to the first AP through the PAR;

receiving a handover response message at the second AP from the first AP through the PAR;

confirming, at the second AP, whether the handover response message has a Pairwise Master Key (PMK) therein;

generating an authentication key at the second AP when the handover response message has the PMK therein;

generating a Message Authentication Code (MAC) using the authentication key and transmitting a ranging response message from the second AP to the AT when the handover response message has the PMK information of the AT therein; and generating, at the second AP, a Key Encryption Key (KEK) using the authentication key.

8. The drop-handover security context transmitting method of claim 7, further comprising storing security-related information of the AT in the handover response message at the second AP, and transmitting a handover acknowledge message from the second AP to the PAR.

9. The drop-handover security context transmitting method of claim 7, wherein generating the KEK comprises updating traffic-related parameters.

10. The drop-handover security context transmitting method of claim 7, wherein transmitting the handover request message to the first AP comprises authenticating the ranging request message.

11. The drop-handover security context transmitting method of claim 7, wherein generating the authentication key comprises transmitting a ranging response message from the second AP to the AT using the authentication key.

12. A method for transmitting a drop-handover security context of a Packet Access Router (PAR), when an Access Terminal (AT) is no longer serviced by a service cell of a first Access Point (AP) connected to the PAR and is moved to a service cell of a second AP connected to the PAR, the drop-handover security context transmitting method of the PAR comprising:

receiving a handover request message at the PAR from the second AP and transmitting the handover request message from the PAR to the first AP;

receiving a handover response message at the PAR from the first AP;

confirming, at the PAR, whether the handover response message has first Pairwise Master Key (PMK) information therein;

transmitting the handover response message including the first PMK information from the PAR to the second AP when the handover response message has the first PMK information therein; and receiving a handover acknowledge message at the PAR from the second AP in response to the handover response message and transmitting the handover acknowledge message from the PAR to the first AP.

13. The drop-handover security context transmitting method of claim 12, further comprising:

confirming, at the PAR, whether PAR-managed information includes second PMK information of the AT when the handover response message has no first PMK information therein;

generating, at the PAR, an authentication key when the PAR-managed information has the second PMK information of the AT therein; and transmitting the handover response message including the authentication key information from the PAR to the second AP when the PAR-managed information has the second PMK information of the AT therein.

14. A method for transmitting a drop-handover security context of a first Access Point (AP), when an Access Terminal (AT) is no longer serviced by a service cell of a first AP connected to a Packet Access Router (PAR) and is moved to a service cell of a second AP connected to the PAR, the drop-handover security context transmitting method of the first AP comprising:

receiving a handover request message at the first AP from the second AP through the PAR;

confirming, at the first AP, whether the handover request message has a security context of the AT therein;

confirming, at the first AP, authentication of a ranging request message using an authentication key of the AT when the subsidy-handover request message has a security context of the AT therein;

confirming, a the first AP, whether the handover request message has one or more of a traffic-related key and a Pairwise Master Key (PMK) of the AT when the ranging request message is authenticated; and transmitting a handover response message including the one or more of the traffic-related key and the PMK, from the first AP to the second AP.

15. The drop-handover security context transmitting method of claim 14, further comprising establishing a result value of the handover response message as a failure and transmitting the same when the ranging request message is not authenticated.

* * * * *